(12) United States Patent
Hasegawa et al.

(10) Patent No.: US 6,636,677 B2
(45) Date of Patent: Oct. 21, 2003

(54) OPTICAL FIBER

(75) Inventors: Takemi Hasegawa, Yokohama (JP);
Eisuke Sasaoka, Yokohama (JP);
Masayuki Nishimura, Yokohama (JP);
Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 108 days.

(21) Appl. No.: 09/793,415

(22) Filed: Feb. 27, 2001

(65) Prior Publication Data

US 2001/0028775 A1 Oct. 11, 2001

Related U.S. Application Data

(60) Provisional application No. 60/246,761, filed on Nov. 9, 2000, and provisional application No. 60/246,725, filed on Nov. 9, 2000.

(30) Foreign Application Priority Data

Feb. 28, 2000 (JP) ..................... P2000-051783
May 1, 2000 (JP) ..................... P2000-132668

(51) Int. Cl.$^7$ .................................. G02B 6/02
(52) U.S. Cl. ...................... 385/127; 385/125
(58) Field of Search .................. 385/127, 123–126

(56) References Cited

U.S. PATENT DOCUMENTS 5,802,236 A    9/1998    DiGiovanni et al.

FOREIGN PATENT DOCUMENTS

| EP | 0737873 A2 | 10/1996 |
|---|---|---|
| WO | WO 99/00685 | 1/1999 |
| WO | WO 99/64903 | 12/1999 |
| WO | WO 00/16141 | 3/2000 |
| WO | WO 00/37974 | 6/2000 |
| WO | WO 00/49435 | 8/2000 |
| WO | WO 00/49436 | 8/2000 |
| WO | WO 00/60388 | 10/2000 |

OTHER PUBLICATIONS

J.C. Knight, T.A. Birks, P.ST. J. Russell, and D.M. Atkin, "All–Silica Single–Mode Optical Fiber with Photonic Crystal Cladding: Errata," Optics Letters, vol. 22, No. 7, Apr. 1, 1997, pp. 484–485.

J.C. Knight, T.A. Birks, P.ST. J. Russell, and D.M. Atkin, "All–Silica Single–Mode Optical Fiber with Photonic Crystal Cladding, " Optics Letters, vol. 21, No. 19, Oct. 1, 1996, pp. 1547–1549.

T.A. Birks, J.C. Knight, and P. St. J. Russell, "Endlessly Single–Mode Photonic Crystal Fiber," Optics Letters, vol. 22, No. 13, Jul. 1, 1997, pp. 961–963.

"Soliton effects in photonic crystal fibres at 850nm", W.J. Wadsworth, et al., Electronics Letters, Jan. 6, 2000, vol. 36, No. 1, p. 53–55.

"Cyndrically symmetrical hollow fiber", Jianqui Xu et al., Elsevier Science B.V., Aug. 15, 2000, vol. 182, p. 343–348.

*Primary Examiner*—Khiem Nguyen
(74) *Attorney, Agent, or Firm*—McDermott, Will & Emery

(57) ABSTRACT

In an optical fiber composed of a core region and a cladding region surrounding the core region and having a plurality of regions made of sub mediums having refractive indices different from a refractive index of a main medium disposed in a main medium constituting this cladding region, these regions made of the sub mediums are arranged in one given or a plurality of a given circular annular regions and the centers of the regions made of the sub mediums in respective circular annular regions are arranged on the same circumference centered at the center of the core.

14 Claims, 10 Drawing Sheets

PRIOR ART

OPTICAL FIBER

CROSS-REFERENCE TO RELATED APPLICATION

This application claims priority to Provisional Application Serial No. 60/246,761 filed Nov. 9, 2000, and No. 60/246,725 filed Nov. 9, 2000 which are hereby incorporated by reference in its/their entirety.

BACKGROUND OF THE INVENTION

1. Field of the Invention

The present invention relates to an optical fiber which can be suitably used as an optical transmission path and a dispersion compensator.

2. Description of the Related Art

FIG. 14 is a cross-sectional view showing a central portion of an optical fiber including microstructures which has been known conventionally. This optical fiber has a structure in which silica glass 61 constitutes a main medium and a large number of voids (vacant holes) 62 are disposed in a cross section thereof. A central portion in cross section having no voids 62 constitutes a core region 63 and a portion surrounding the core region 63 and including a large number of voids 62 constitutes a cladding region 64.

The principle of light confinement of the optical fiber including such microstructures is explained qualitatively using a concept called effective refractive indices (for example, T. A. Birks et al. Optics Letters Vol. 22 p.961 (1997)). Due to the presence of the microstructures, in a strict sense, the refractive index should show a complicate distribution in the cladding region 64. However, on the assumption that the optical waveguiding characteristics can be approximated by replacing the inside of the cladding region with a homogeneous medium, the refractive index of the homogeneous medium is called the effective refractive index. The effective refractive index $n_{eff}$ satisfies a following equation.

$$\frac{1}{\left(\frac{f_1}{n_1^2} + \frac{f_2}{n_2^2}\right)} \leq n_{eff}^2 \leq f_1 n_1^2 + f_2 n_2^2 \quad (1)$$

where, n is the refractive index and f is the volume fraction. Further, a suffix 1 represents a main medium (silica glass) and a suffix 2 represents a sub medium (air). With respect to the volume refraction, $f_1 + f_2 = 1$ is held. Usually, since $n_1 > n_2$, the both side members in the equation (1) become smaller corresponding to the increase of $f_2$. Accordingly, the effective refractive index of the cladding region 64 including a large number of voids 62 becomes smaller than the effective refractive index of the core region 63 so that the light confinement is realized in the same manner as the usual optical fiber.

Further, a microstructured optical fiber having a greater negative dispersion than the optical fiber shown in FIG. 14 is disclosed in U.S. Pat. No. 5,802,236. As shown in FIG. 15, in this optical fiber, the cladding region is constituted by an inner cladding region and an outer cladding region and by making the void diameter in the inner cladding region greater than the void diameter in the outer cladding region, the effective refractive index of the inner cladding region is made smaller than the outer cladding region.

The previously-mentioned model assumed to define the effective refractive index is considered to be reasonable as long as the optical wavelength is sufficiently long compared to the scale of the microstructure. However, as the optical wavelength becomes shorter, the light is locally concentrated at portions having the high refractive index and hence, it is considered that the assumption that the structure having a non-uniform refractive index distribution can be replaced by a homogeneous medium will lose the validity. As a result, it should be noted that specification of the structure based on effective refractive index is inevitably ambiguous.

In the conventional microstructured optical fiber in which the void diameters in cross section are not uniform, it is difficult to securely realize desired characteristics. This is because, although the void diameters are changed in response to the glass surface tension and/or the internal stress at the time of fiber drawing, the amount of the change depends on the void diameters. For example, when the void diameters are small, the surface tension strongly acts and hence, the contraction is liable to occur compared with the case in which the void diameters are large. As a result, it is difficult to perform the fiber drawing such that each of the voids having different diameters is formed in the fiber with the desired diameters.

SUMMARY OF THE INVENTION

The present invention has been made in view of the above circumstances to provide an optical fiber which has sub-medium regions and is capable of securely realizing desired characteristics even when cross sectional areas of the sub-medium regions are changed at the time of fiber drawing.

To solve the problems, according to the present invention, in an optical fiber composed of a core and a cladding surrounding the core, where a given cross section of the cladding includes a plurality of regions made of sub mediums having refractive indices different from the refractive index of the main medium constituting this cladding, wherein the regions made of the sub mediums are arranged in one given or a plurality of given circular annular regions and the centers of the regions made of the sub mediums in each of the circular annular regions are arranged on the same circumference centered at the center of the core and having a diameter predetermined for each of the circular annular regions.

Here, the main medium is a material which can constitute an optical fiber by itself and the regions of the main medium are connected together. On the other hand, the sub mediums may be materials which cannot constitute the optical fiber by themselves and are scattered in a plurality of regions in the optical fiber. A typical main medium is silica glass and a typical sub medium is air or an inert gas.

According to the finding of the inventors of the present inventions, structures containing regions of sub mediums can be specified with less ambiguity using mean refractive index which is expressed by a following equation. Here, assuming that a region can be divided into M sub regions and each of them is formed by a homogeneous medium, the mean refractive index $n_{avg}$ of the region can be expressed by the following equation (2).

$$n_{avg} = \sqrt{\sum_{i=1}^{M} f_i n_i^2} \quad (2)$$

That is, the mean refractive index $n_{avg}$ is the RMS (Root Mean Square) average of the refractive indices of respective mediums weighted by the volume fraction of each medium. Here, $n_i$ is the refractive index of the i-th medium and $f_i$ is its volume fraction and a following equation holds.

$$\sum_{i=1}^{M} f_i = 1 \qquad (3)$$

Accordingly, provided that the regions are determined, the mean refractive index is unambiguously determined. In other words, this implies that the value of the mean refractive index depends on the determination of the regions. According to the optical fiber of the present invention, the sub-medium regions are arranged such that they are positioned in the inside of the given circular annular region and their centers are positioned on given circumferences centered at the center of the core. Due to such a constitution, it becomes easy to design the mean refractive index in each of the circular annular regions so that the optical fiber possesses the desired optical characteristics.

The sub-medium regions can be arranged on the circumferences centered at the center of the core so that the arrangement has the four-fold rotational symmetry with respect to the center. Such a constitution is preferable to decrease the mode birefringence and the polarization mode dispersion.

At least one of cross-sectional areas and the refractive indices of these regions made of the sub mediums may change along the fiber axis. Due to such a constitution, the mean refractive index of the circular annular region including the sub mediums can be changed along the fiber axis. Accordingly, the optical fiber whose optical characteristics are changed along its axis can be easily realized.

Further, it is preferable that sections where the cladding does not contain the sub mediums are spaced along the fiber axis. Thus, by providing the sections having no sub-medium regions in cross section, it becomes possible to cleave the optical fiber and splice it to another optical fiber by fusion without excess transmission loss at the splice due to deformation of the structure and contamination of the sub-medium regions.

Further, it is preferable that the chromatic dispersion at a given wavelength is changed along the fiber axis. Due to such a provision, a chromatic dispersion managed fiber composed of plural fiber sections which differ in the chromatic dispersion characteristics can be realized and the optical characteristics whose realization is difficult or impossible with an optical fiber composed of a single kind of fiber section can be realized. For example, the characteristics that absolute value of the total chromatic dispersion is small over a broad wavelength range and the characteristics that the absolute value of the local chromatic dispersion is large and the absolute value of the total chromatic dispersion is small can be realized.

Further, an optical fiber includes at least a section of the first kind where the chromatic dispersion at a given wavelength is positive and a section of the second kind where the chromatic dispersion at the same wavelength is negative can be realized. This optical fiber is suitable as a transmission path for an optical communication of a large capacity. This is because the deterioration of the transmission quality due to the non-linear optical phenomena generated among optical signals having different wavelengths can be made small.

It is preferable that the chromatic dispersion at the given wavelength band is larger than +1 ps/nm/km in the section of the first kind and is smaller than −1 ps/nm/km in the section of the second kind, and the total length of the fiber sections whose absolute value of the chromatic dispersion becomes below 1 ps/nm/km at the wavelength is below 1/10 of the full length of the optical fiber. By properly setting the lengths and the chromatic dispersion values of respective fiber sections, the expansion of the optical pulses derived from the total chromatic dispersion can be made small. As a result, an optical fiber which exhibits the least deterioration of the transmission quality derived from the nonlinear optical phenomena among optical signals having different wavelengths and the least expansion of the optical pulses derived from the total chromatic dispersion and hence is suitable as a transmission path for an optical communication of a large capacity can be realized.

It is preferable that the chromatic dispersion slopes at the given wavelength band in the section of the first kind and the section of the second kind have opposite signs. By setting the chromatic dispersion slopes in this manner, an optical fiber having an absolute value of a total chromatic dispersion which is smaller than a given value in a given wavelength band can be obtained. As a result, the absolute value of the total chromatic dispersion can be made small over a broad wavelength range so that the transmittable capacity of optical signals can be increased.

Further, it is preferable that the chromatic dispersion slope at a given wavelength is negative in the section of the first kind and is positive in the section of the second kind. Due to such a constitution, an optical fiber in which a locally-zero-dispersion wavelength which makes the local chromatic dispersion zero in fiber sections having not less than a given length is present in the longer wavelength side of the operating wavelength band can be realized. The wavelength band in the vicinity of the locally-zero-dispersion wavelength cannot be used for the wavelength division multiplexing transmission due to the deterioration of the transmission quality dei to the nonlinear optical phenomena generated among optical signals having different wavelengths. However, the wavelength band remote from the locally-zero-dispersion wavelength can be used by using a suitable dispersion compensator. According to the present invention, an optical fiber having no locally-zero-dispersion wavelength in the short-wavelength side of the operating wavelength band which cannot be realized by the prior art can be realized and hence, the expansion of the operating wavelength band toward the short wavelength side can be realized.

It is preferable that the structural densities of the sub-medium regions is different between at least the two circular annular regions. By making the structural densities of the sub-medium regions different between the circular annular regions, the mean refractive indices can be easily made different between the circular annular regions. Here, the structural density means the number of sub-medium regions per unit cross-sectional area of the fiber.

Further, it is preferable that the cross-sectional areas of respective regions made of sub mediums are substantially uniform in the transverse cross section of each of the circular annular region. Due to such a constitution, the realization of desired optical characteristics can be facilitated. Usually, the area fraction of the sub-medium, that is, the proportion of the area occupied by the sub medium in a given region, is changed at the time of fiber drawing. Although this change depends on the areas of respective sub-medium regions, the change is substantially uniform in the inside of the circular annular region. Accordingly, by setting the areas of the sub-medium regions in the inside of the circular annular region uniform, the change of the area fraction of the sub medium becomes substantially uniform. As a result, by adjusting the fiber drawing conditions such that one sub-medium region has a desired area fraction, it becomes possible to realize the desired values of area fractions for the area fractions of other sub-medium regions in the inside of the circular annular region.

Further, it is preferable that the cross-sectional areas of the regions made of the sub mediums are all substantially uniform in the transverse cross section of the fiber. Due to such a constitution, by merely adjusting the fabrication condition so that one of the sub-medium regions have the desired value of the area fraction, the mean refractive index of each circular annular region can be adjusted to a desired value at the same time so that the optical fibers can be easily and securely fabricated with the desired characteristics.

The optical fiber according to the present invention may include at least two cladding regions, and structural densities of the region made of the sub mediums are different between the two cladding regions.

In the optical fiber of the present invention, the mean refractive index distribution in the cross section of the optical fiber may be changed by controlling the structural densities of the sub medium regions. That is, compared with the prior art, even when the numbers of the sub-medium regions are short, a desired mean refractive index distribution can be realized. Although the cross-sectional areas of the sub-medium regions are liable to be changed during fiber drawing, their structural densities are hardly changed. Accordingly, the control of the fiber drawing becomes easy and the stable fabrication of products becomes possible.

For example, by increasing (decreasing) the structural density of regions made of sub mediums having the lower (higher) refractive index than the main medium, the mean refractive index can be decreased and by performing the inverse change of the structural density, the mean refractive index can be increased whereby the range in which mean refractive index can be realized can be broadened.

Here, the maximum value of the cross-sectional areas of the regions made of the sub mediums in the cross section of the fiber may be smaller than 10 times of the minimum value of them. This is because, in the case that the cross-sectional area of sub-medium regions is changed, since the manner of change of the area fraction of the sub-medium at the time of fiber drawing depends on the cross sectional area of sub-medium regions, when the maximum cross-sectional area and the minimum cross-sectional area differ greatly, it is difficult to realize a desired cross-sectional area of sub-medium regions and accordingly the desired optical characteristics.

It is further preferable that the cross-sectional areas of the regions made of the sub mediums are all substantially uniform in the cross section of the fiber. By making the cross-sectional areas of the sub-medium regions in the transverse cross section of the fiber all substantially uniform, the areas of the sub-medium regions can be realized as desired if only one of them is realized as desired. Accordingly, the optical fiber can be easily and securely fabricated with desired optical characteristics.

BRIEF DESCRIPTION OF THE DRAWINGS

FIG. 2 to FIG. 5 are views showing calculated results of waveguide dispersion and the effective core area with respect to examples 1 to 7 of the first embodiment, wherein FIG. 2 shows the example 1 and the example 2 in comparison, FIG. 3 shows the example 1 and the example 3,4 in comparison, FIG. 4 shows the example 1 and the examples 5,6 in comparison and FIG. 5 shows the examples 3,4 and the example 7 in comparison.

DESCRIPTION OF THE PREFERRED EMBODIMENT

Figure 1:
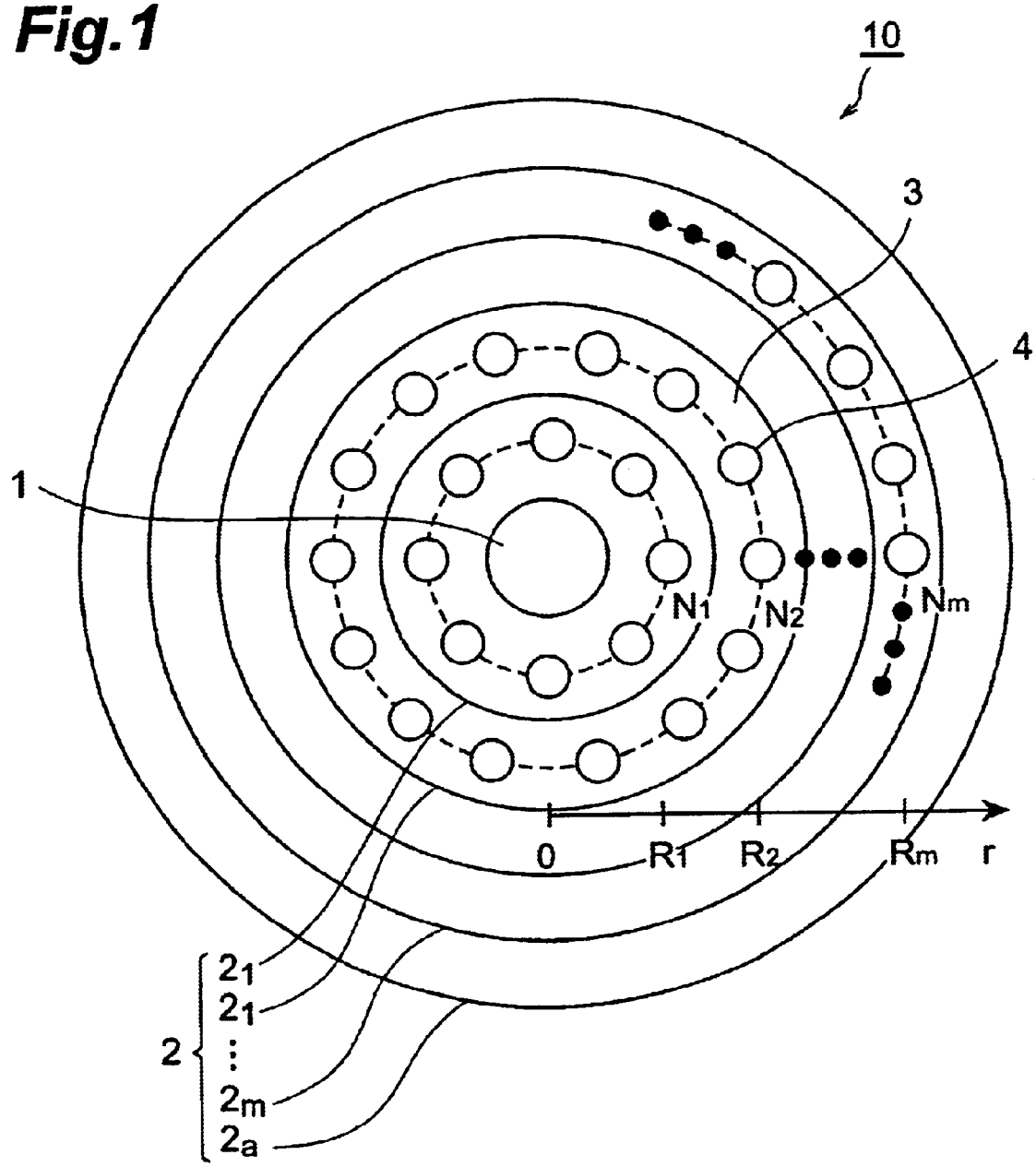
FIG. 1 is a transverse cross-sectional view showing a first embodiment of an optical fiber according to the present invention.

Preferred embodiments of the optical fiber according to the present invention are explained in detail hereinafter in conjunction with attached drawings. To facilitate the comprehension of the explanation, the same reference numerals denote the same parts, where possible, throughout the drawings, and a repeated explanation will be omitted.

FIG. 1 is a cross-sectional view showing a preferred embodiment of an optical fiber according to the present invention. As shown in FIG. 1, the optical fiber 10 of this embodiment is constituted by a core region 1 and a cladding region 2 which surrounds the core region 1. Here, the respective regions are made of silica glass 3. In the cladding region 2, a large number of voids 4 which constitute sub mediums are arranged in a silica glass region 3 which constitutes a main medium.

The transverse cross sections of these voids 4 are all circular. A plurality of voids ($N_i$ pieces, i indicating the layer number) are respectively arranged on a plurality (m) of concentric circumferences having their centers at the center of the core region 1 (hereinafter called "core center"). To be more specific, the centers of $N_1$, $N_2$, ... $N_m$ pieces of voids 4 are arranged on the circumferences of circles respectively having radii of $R_1$, $R_2$, ... $R_m$ having their centers at the center of the core. Although it is assumed that the void diameters of the voids 4 are all set equal in the explanation discussed hereinafter, it may be possible to adopt a method which suitably arranges the voids 4 having different diameters. Accordingly, it is considered that the cladding region 2 is constituted by a plurality of circular annular regions $2_1$ to $2_m$ in the insides of which the voids 4 are respectively arranged and an outer cladding region 2a. A boundary between the circular annular regions $2_i$ and $2_{i+1}$ ($1 \leq i \leq m-i$) is a circumference of a radius $(R_i+R_{i+1})/2$ having its center at the core center, a boundary between the core region 1 and the circular annular region $2_1$ is a circumference of a radius $R_1/2$, and a boundary between the circular annular region $2_m$ and the outer cladding region 2a is a circumference of a radius $(3R_m-R_{m-1})/2$. It may be possible to adopt a structure which is not provided with the outer cladding region 2a.

Subsequently, with respect to the optical fiber 10 of this embodiment, the mean refractive index distribution in cross section shown in FIG. 1 is explained. Here, the mean refractive index distribution has been investigated with respect to seven examples (called "example 1 to example 7) which have different distributions of the voids 4. In the examples 1 to 7, the number of circular annular regions where the voids 4 are present, that is, the number m of layers is set to equal number 8 and the diameters d of the voids 4 are all equal. The radii $R_1$ to $R_8$ of the concentric circumferences on which the centers of respective voids 4 are arranged are set such that $R_1=3.842d$, $(R_k-R_{k-1})=3.017d$ ($2 \leq k \leq m$). The numbers $N_1$ to $N_8$ of the voids 4 in respective circular annular regions $2_1$ to $2_8$ are set as shown in Table 1 with respect to respective examples 1 to 7.

TABLE 1

| Example | Number of voids 4 in respective circular annular regions $2_1$ to $2_8$ | | | | | | | |
|---|---|---|---|---|---|---|---|---|
| | $N_1$ | $N_2$ | $N_3$ | $N_4$ | $N_5$ | $N_6$ | $N_7$ | $N_8$ |
| 1 | 8 | 14 | 20 | 26 | 32 | 38 | 44 | 50 |
| 2 | 6 | | | | | | | |
| 3 | 10 | | | | | | | |
| 4 | 12 | | | | | | | |
| 5 | 8 | 12 | | | | | | |
| 6 | 8 | 10 | | | | | | |
| 7 | 12 | 12 | | | | | | |

Here, the mean refractive index $n_{avg,k}$ of the k-th circular annular region is expressed by a following equation where the refractive index of the voids 4 is $n_{sub}$, the refractive index of the silica glass region is $n_{main}$, the inner diameter of the region is $R_{i,k}$, and the outer diameter is $R_{o,k}$.

$$n_{avg,k} = \sqrt{n_{main}^2 - \frac{N_k d^2}{4(R_{o,k}^2 - R_{i,k}^2)} \times (n_{main}^2 - n_{sub}^2)} \quad (4)$$

Since the refractive index $n_{sub}$ of the voids 4 is 1 and the refractive index $n_{main}$ of the silica glass region 3 is 1.444, the mean refractive index distribution of the circular annular regions $2_1$ to $2_8$ in respective examples 1 to 7 takes values shown in following Table 2.

TABLE 2

| Example | Mean refractive index distribution of circular annular regions in examples 1 to 7 | | | | | | | |
|---|---|---|---|---|---|---|---|---|
| | $n_{avg,1}$ | $n_{avg,2}$ | $n_{avg,3}$ | $n_{avg,4}$ | $n_{avg,5}$ | $n_{avg,6}$ | $n_{avg,7}$ | $n_{avg,8}$ |
| 1 | 1.41 | 1.41 | 1.41 | 1.41 | 1.41 | 1.41 | 1.41 | 1.41 |
| 2 | 1.42 | 1.41 | 1.41 | 1.41 | 1.41 | 1.41 | 1.41 | 1.41 |
| 3 | 1.40 | 1.41 | 1.41 | 1.41 | 1.41 | 1.41 | 1.41 | 1.41 |
| 4 | 1.39 | 1.41 | 1.41 | 1.41 | 1.41 | 1.41 | 1.41 | 1.41 |
| 5 | 1.41 | 1.42 | 1.41 | 1.41 | 1.41 | 1.41 | 1.41 | 1.41 |
| 6 | 1.41 | 1.42 | 1.41 | 1.41 | 1.41 | 1.41 | 1.41 | 1.41 |
| 7 | 1.39 | 1.42 | 1.41 | 1.41 | 1.41 | 1.41 | 1.41 | 1.41 |

The refractive index of the core region 1 is 1.444 and hence is higher than the mean refractive index of any one of the circular annular regions $2_1$ to $2_8$ in the examples 1 to 7. In an example 1, the mean refractive indices of circular annular regions $2_1$ to $2_8$ are approximately equal. Since the mean refractive indices are considered homogeneous in the cladding regions 2, example 1 is called a homogenous cladding structure. The examples 2 to 7 are structures which are formed by applying some modification to the homogeneous cladding structure. Although the void diameter d is uniform in cross section of the fiber, in the examples 2 to 7, a given mean refractive index distribution can be realized by changing the number of voids 4 in the circular annular region $2_1$ and the circular annular region $2_2$, that is, the structural density of the sub-medium regions.

Figure 2:
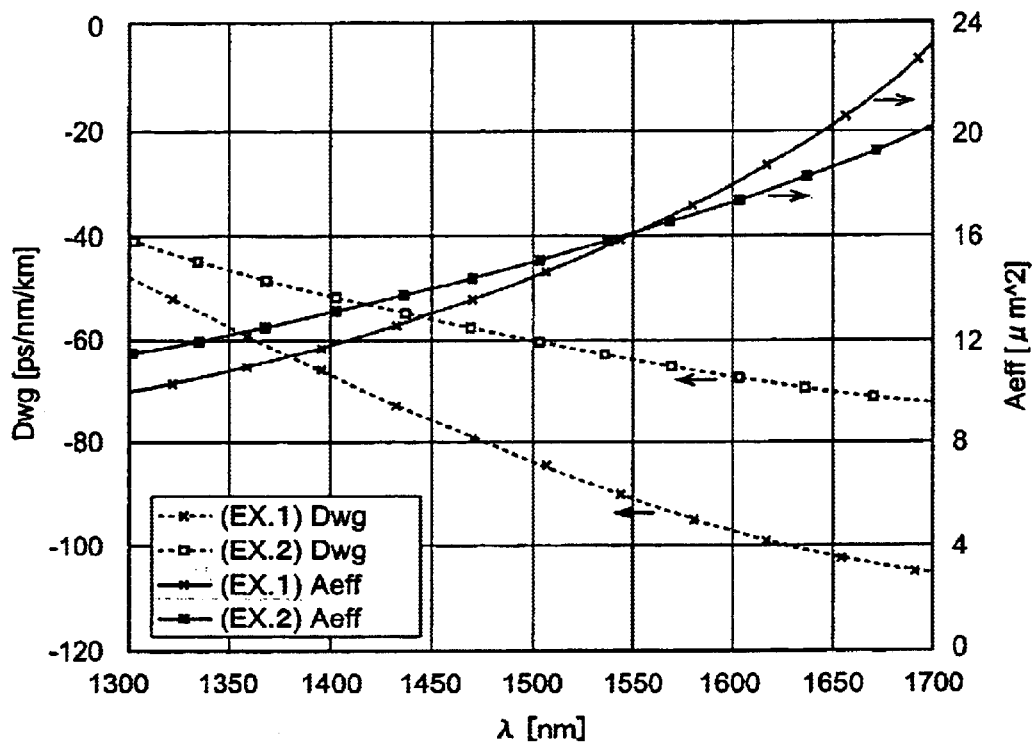

FIG. 2 shows a calculated result of the waveguide dispersion and the effective core area with respect to the example 1 and the example 2. The example 2 is a structure which has increased the mean refractive index in the circular annular region $2_1$ compared with the example 1. In FIG. 2, the waveguide dispersion $D_{wg}$ [ps/nm/km] is taken on the axis of left ordinates, the effective core area $A_{eff}$ [$\mu m^2$] is taken on the axis of right ordinates and the wavelength $\lambda$ [$\mu m$] of the light is taken on the axis of abscissa.

With respect to both of the examples 1 and 2, the dimensions and arrangements of the voids 4 are selected such that the effective core area $A_{eff}$ becomes $A_{eff}=16$ $\mu m^2$ at the wavelength of 1550 nm. The diameter d of the voids 4 is set to d=0.44 $\mu m$ in the example 1 and d=0.40 $\mu m$ in the example 2.

In the example 2, the change of waveguide dispersion $D_{wg}$ to the change of wavelength is small compared with that of the example 1. This implies that the sensitivity of waveguide dispersion $D_{wg}$ to the fluctuation of structural parameters such as a pitch is small. Further, the increment pace $d(A_{eff})/d\lambda$ of the effective core area to wavelength in the example 2 is small compared with that of the example 1. The fact that the increment pace of the effective core area to wavelength is small implies that the degree of light confinement to the core is high and hence, the bending loss is small. Further, the fact that the bending loss is small implies that the larger effective core area can be realized with the same bending loss.

Accordingly, it has been found that by elevating the mean refractive index in the circular annular region $2_1$ which constitutes the innermost cladding region compared with the homogeneous cladding structure, the sensitivity of the chromatic dispersion to the fluctuation of structural parameters can be reduced and the large effective core area can be realized and the low bending loss can be also realized.

Figure 3:
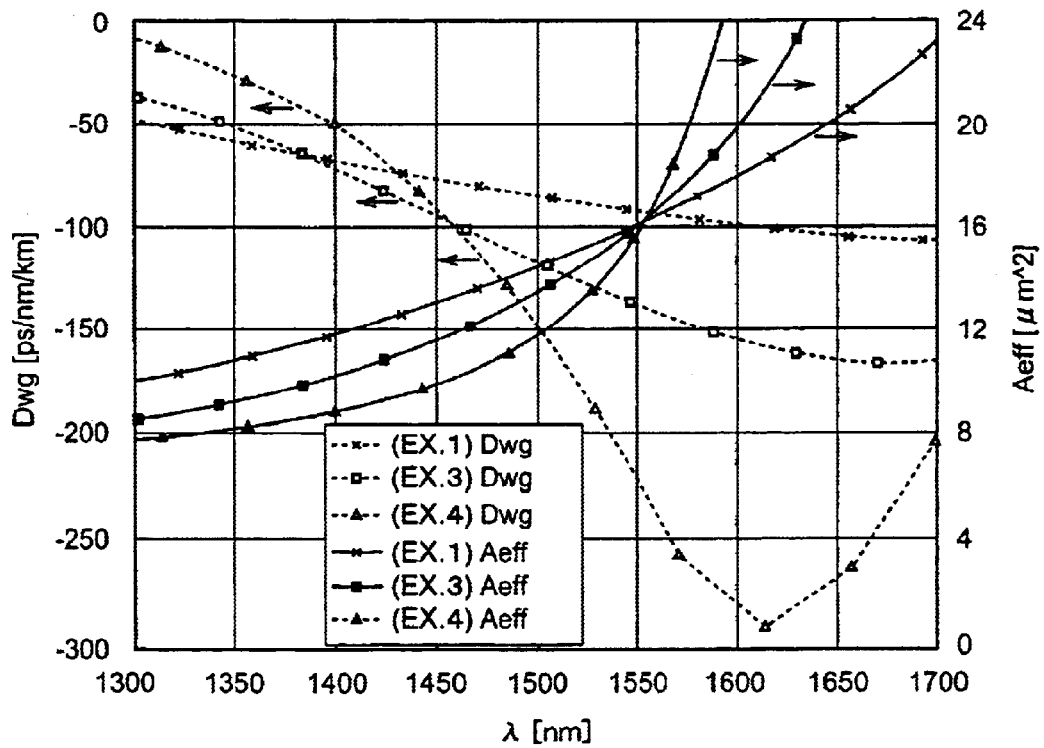

Subsequently, FIG. 3 shows a calculated result of the waveguide dispersion and the effective core area with respect to the examples 1, 3 and 4 in the above table. The example 3 and the example 4 are structures which have decreased the mean refractive index of the first cladding region compared with that of the example 1. In the examples 1, 3 and 4, as in the case of FIG. 2, the dimensions and the arrangement of the voids 4 are selected such that their effective core areas at the wavelength of 1550 nm all become $A_{eff}=16$ $\mu m^2$. The diameter d of the voids 4 is set to d=0.44 $\mu m$ in the example 1, d=0.49 $\mu m$ in the example 3 and d=0.51 $\mu m$ in the example 4.

The waveguide dispersion $D_{wg}$ at the wavelength 1550 nm is increased to negative in order of the examples 1, 3 and 4. Further, while the waveguide dispersions $D_{wg}$ of these three structures in the vicinity of the wavelength of 1420 nm become substantially equal, their waveguide dispersion slopes $dD_{wg}/d\lambda$ in this state are increased to negative in order of the examples 1, 3 and 4. With respect to the example 4, although the waveguide dispersion $D_{wg}$ of −224 ps/nm/km is obtained at the wavelength of 1550 nm, assuming that the material dispersion of silica glass at the wavelength of 1550 nm is 22 ps/nm/km, it is estimated that the chromatic dispersion of this optical fiber is approximately −202 ps/nm/km. Assuming that the chromatic dispersion of the usual single-mode optical fiber having the zero dispersion wavelength of 1.3 μm is approximately 20 ps/nm/km at the wavelength of 1550 nm, to perform the dispersion compensation of this single-mode optical fiber, the length of the optical fiber of the example 4 is sufficient if it is one tenth of the single-mode optical fiber. Further, since the chromatic dispersion slope of this single-mode optical fiber is usually positive, this can be compensated for by the negative dispersion slope of the optical fiber of the example 4.

Accordingly, it has been found that compared with the optical fiber having the homogenous cladding structure, the optical fiber of this embodiment can realize the large chromatic dispersion to negative and the large chromatic dispersion slope to negative by reducing the mean refractive index of the circular annular region $2_1$ which constitutes the innermost cladding region.

Figure 4:
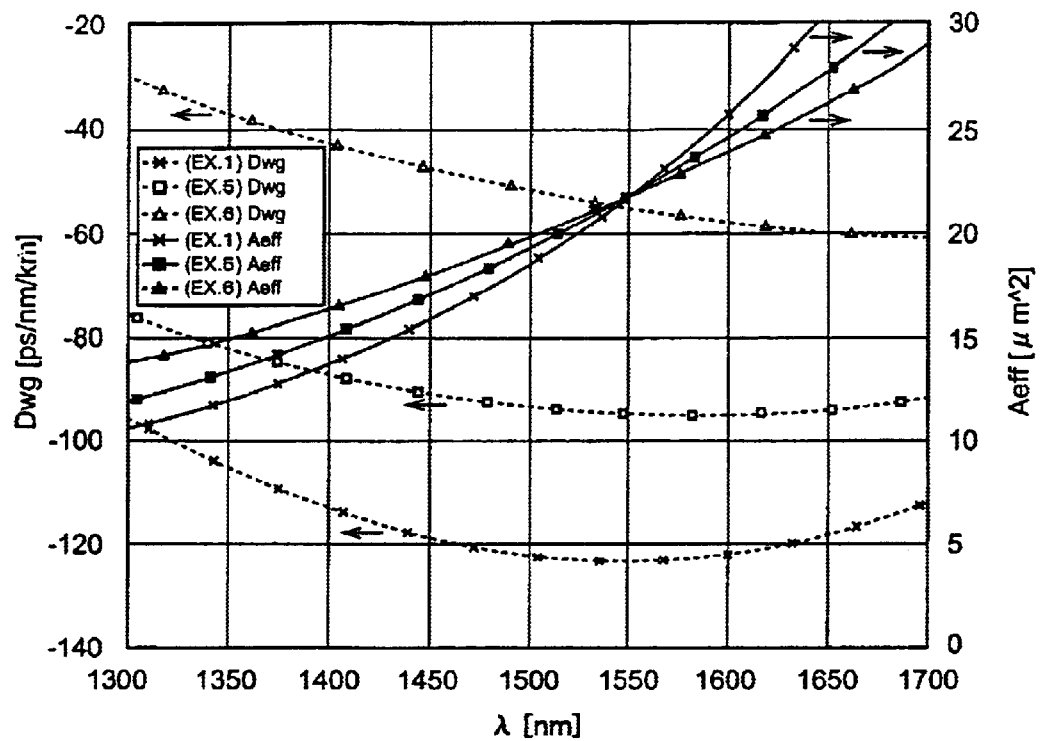

Subsequently, a calculated result of the waveguide dispersion $D_{wg}$ and the effective core area $A_{eff}$ with respect to the examples 1, 5 and 6 is shown in FIG. 4. The example 5 and the example 6 are structures which have increased the mean refractive index of the circular annular region $2_2$ compared with that of the example 1. Here, with respect to all of the examples 1, 5 and 6, the dimensions and arrangements of the voids 4 are selected such that their effective core areas at the wavelength of 1550 nm all become $A_{eff}=22$ μm$^2$. The diameter d of the voids 4 is set to d=0.38 μm in the example 1, d=0.41 μm in the example 5 and d=0.51 μm in the example 6.

The increment pace $d(A_{eff})/d\lambda$ of the effective core area $A_{eff}$ to wavelength at the wavelength of 1550 nm is made smaller in order of the examples 1, 5 and 6. The fact that the increment pace of the effective core area $A_{eff}$ to wavelength is small implies that the sensitivity to the fluctuation of the structural parameters is small and the light confinement is favorable and the bending loss is small. Further, the fact that the bending loss is small implies that the larger effective core area $A_{eff}$ can be realized with the same bending loss. Further, the absolute values of the negative waveguide dispersion become smaller in order of the examples 1, 5 and 6.

Accordingly, it has been found that compared with the optical fiber having the homogeneous cladding structure, the optical fiber of this embodiment can realize the large effective core area and the low bending loss by elevating the mean refractive index of the circular annular region $2_2$ which is the second region counted from the inner side.

Figure 5:
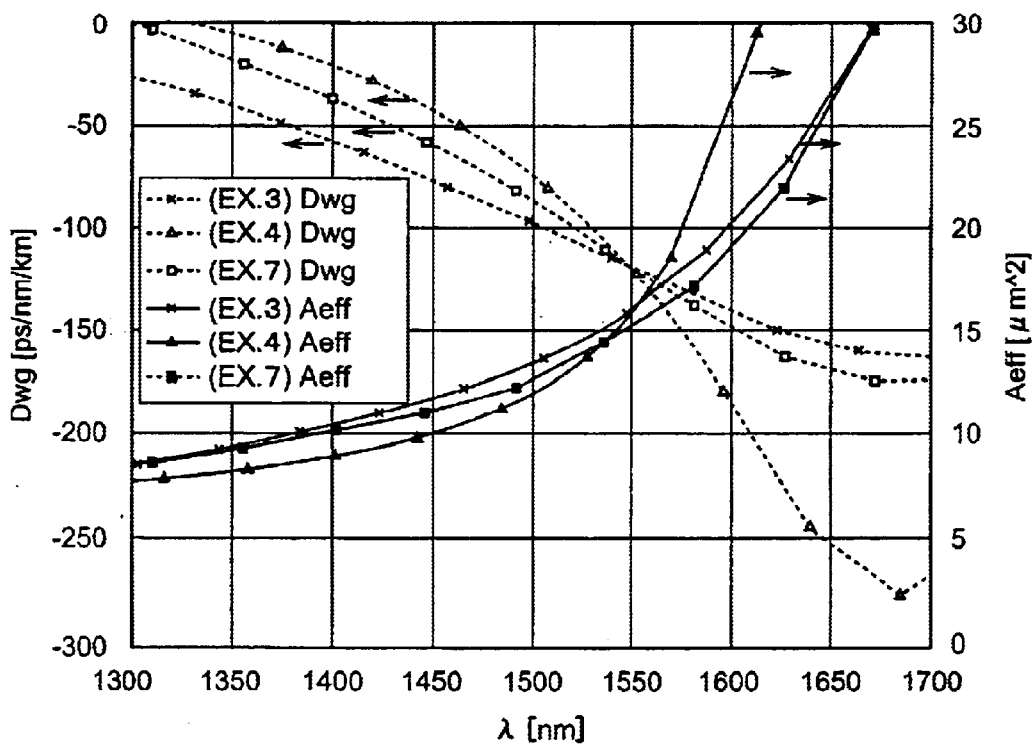

Subsequently, FIG. 5 shows a calculated result of the waveguide dispersion and the effective core area with respect to the examples 3, 4 and 7. While the example 3 and the example 4 are structures which have decreased the mean refractive index of the circular annular region $2_1$ compared with that of the example 1, the example 7 is a structure which has decreased the mean refractive index of the circular annular region $2_1$ and has increased the mean refractive index of the circular annular region $2_2$ compared with those of the example 1. Here, in all of the examples 3, 4 and 7, the dimensions and the arrangement of the voids 4 are selected such that their waveguide dispersions $D_{wg}$ at the wavelength of 1550 nm all become $D_{wg}$=−120 ps/nm/km. The diameter d of the voids 4 is set to d=0.50 μm in the example 3, d=0.53 μm in the example 4 and d=0.54 μm in the example 7.

The example 7 has the low increment pace $d(A_{eff})/d\lambda$ of the effective core area $A_{eff}$ to wavelength at the wavelength of 1550 nm compared with the example 4. The fact that the increment pace of the effective core area $A_{eff}$ to wavelength is small implies that the sensitivity to the fluctuation of the structural parameters is small and the light confinement is favorable and the bending loss is small. Further, the example 7 has the large waveguide dispersion slope to negative at the wavelength of 1550 nm compared with the example 3.

Accordingly, it has been found that compared with the optical fiber having the homogeneous cladding structure, in the structure where the mean refractive index of the circular annular region $2_1$ at the innermost peripheral side is decreased, by elevating the mean refractive index of the circular annular region $2_2$ which is disposed adjacent to the circular annular region $2_1$ at the innermost peripheral side, the low bending loss and the large waveguide dispersion slope to negative can be realized while maintaining the large waveguide dispersion to negative.

Figure 6:
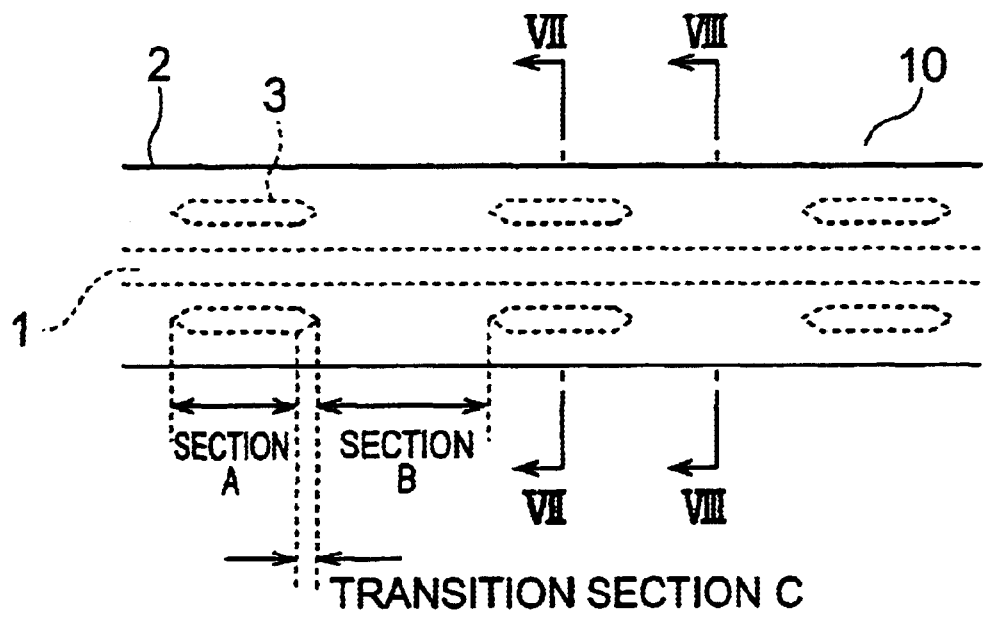
FIG. 6 is a longitudinal cross-sectional view showing a second embodiment of an optical fiber according to the present invention and FIG. 7 and FIG. 8 are respectively cross-sectional views taken along a line VII—VII and a line VIII—VIII.
Figure 7:
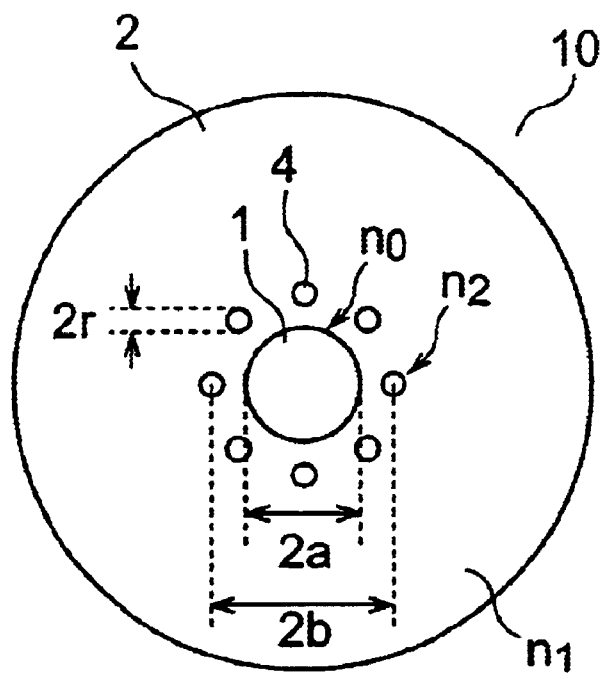
Figure 8:
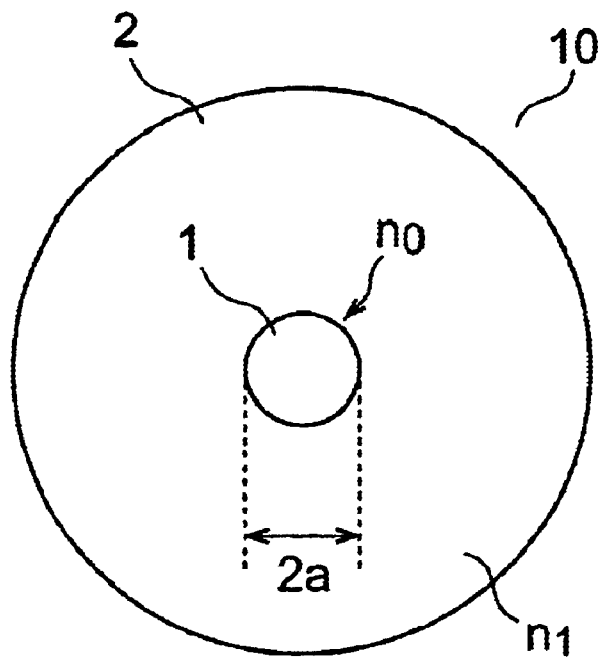

Subsequently, the second embodiment of the optical fiber according to the present invention is explained. FIG. 6 is a cross-sectional view in a fiber axial direction (longitudinal cross-sectional view) of an optical fiber 10a according to the present invention. Further, FIG. 7 and FIG. 8 are respectively transverse cross-sectional views of this optical fiber 10a taken along a line VII—VII and a line VIII—VIII of FIG. 6.

This optical fiber 10a includes a core region 1 and a cladding region 2 which surrounds the core region 1. The core region 1 is made of silica glass doped with Ge. With respect to the cladding region 2, in the pure silica glass which constitutes the main medium, a plurality of, that is, N pieces (8 pieces in FIG. 7) of voids 4 which open in an axial direction at a section A and transition sections C sandwiching the section A disposed in an axial direction which will be explained later are arranged on a circumference having its center at the center of the core region 1 in the cross section. The mediums in the insides of the voids 4 is (hereinafter called "sub mediums") are air.

As shown in FIG. 6, in the optical fiber 10a of this embodiment, the sections A and the sections B are alternately arranged along the fiber axis, wherein the voids 4 are arranged in the cladding region 2 in the sections A and the cladding region 2 is made of a main medium in the section B and does not contain the voids 4. Each transition section C is present between the section A and the section B, wherein the cross-sectional area of each void 4 in the transition section C is gradually decreased along the fiber axis from the section A side to the section B side. The length of the sections A and B is typically not smaller than 100 m. On the other hand, it is preferable that the length of the transition sections C is not more than 1 m. In this manner, by making the length of the transition sections C short compared with the lengths of the section A and the section B, the influence that the optical characteristics of the transition section C gives to the optical characteristics of the whole optical fiber 10a can be ignored.

Figure 9A:
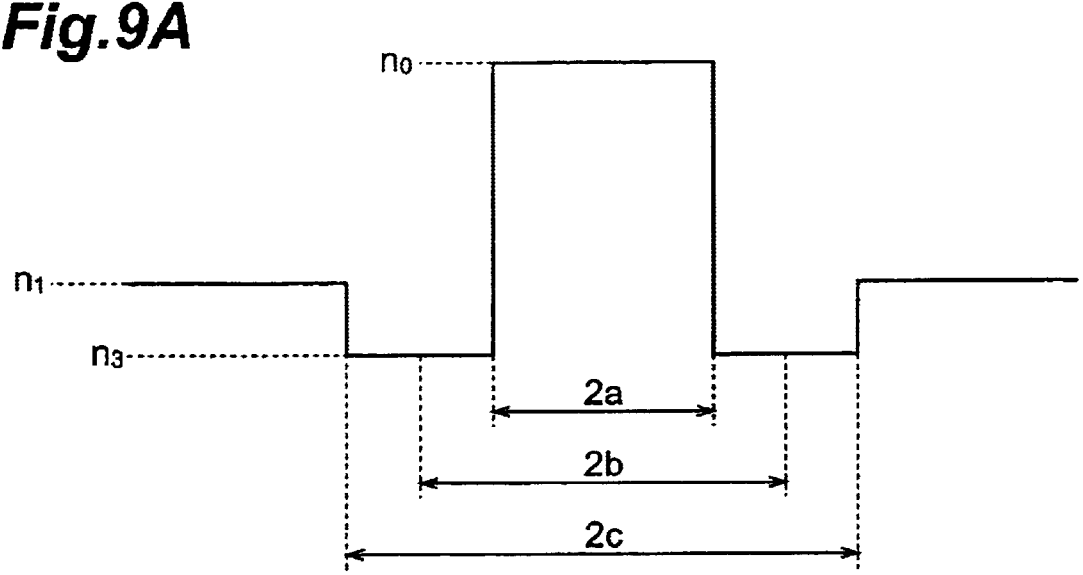
FIG. 9A and FIG. 9B are respectively explanatory views for explaining the refractive index profiles at positions in FIG. 7 and FIG. 8.
Figure 9B:
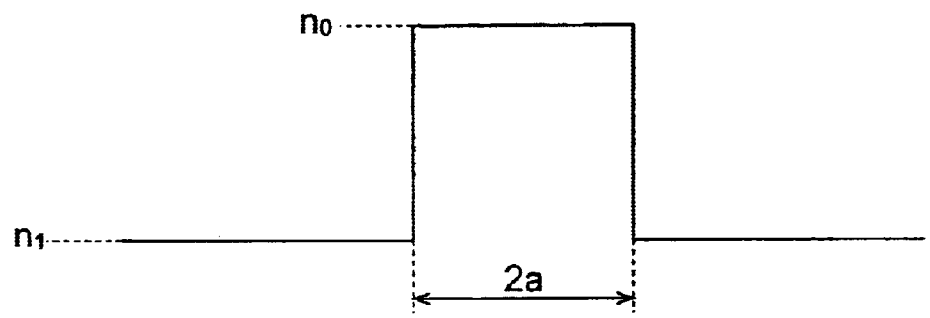

A diameter of the core region 1 is 2a (for example, a=1.74 μm) and the diameter takes the equal values at the sections A and the sections B. As shown in FIG. 7, in the sections A, eight pieces of voids 4 of a radius r (for example, r=0.39 μm) are equidistantly arranged on a circumference of a radius b (for example, b=2.81 μm) having its center at the fiber axis. Refractive indices $n_0$, $n_1$, $n_2$ of the core region 1, the main medium region 3 of the cladding region 2 and the voids 4 are respectively set to $n_0$=1.465 (doped Ge of 14 mol %), $n_1$=1.444 and $n_2$=1.0. The refractive index distribution in cross section at the section A corresponds to the refractive index distribution of the optical fiber which sets the circular annular region $2_1$ (outer radius 2c) including the voids 4 as a depressed portion (see FIG. 9A), while the refractive index distribution in cross section at the section B corresponds to the refractive index distribution of the optical fiber having no depressed portion because of the absence of the voids 4 (see FIG. 9B). Here, assuming the mean refractive index of the circular annular region 2$_1$ as n$_3$, an equation $$n_3 = \sqrt{n_1^2 - \frac{Nr^2}{c^2 - a^2}(n_2^2 - n_1^2)}$$

is held.

Assuming the outer radius c of the circular annular region 2$_1$ as (2b–a) in this optical fiber 10a, n$_3$ becomes n$_3$=1.405.

Figure 10:
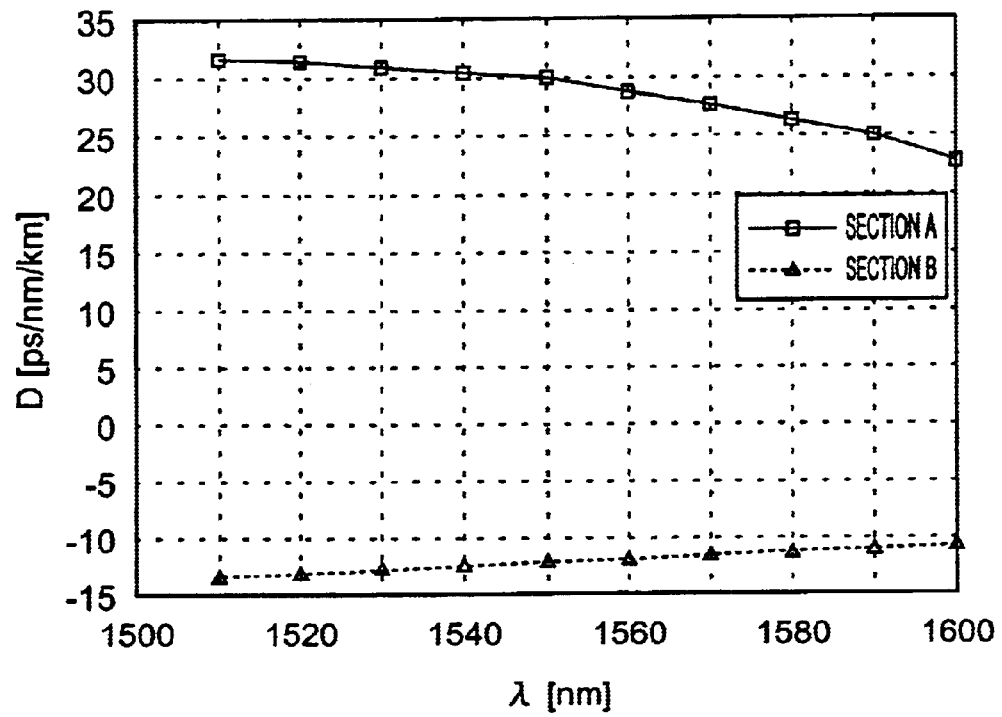
FIG. 10 is a view showing a numerical simulation result of chromatic dispersion characteristics in a second embodiment according to the present invention and FIG. 11 is a view showing a result of a numerical simulation of the mean chromatic dispersion.

FIG. 10 shows a result of numerical simulation of chromatic dispersion characteristics of the sections A and the sections B of this optical fiber 10a wherein the result of the wavelength range of 1510 nm to 1600 nm is shown. As can be clearly understood from the drawing, the section A has the positive chromatic dispersion D and the negative chromatic dispersion slope S=dD/dλ and the sections B has the negative chromatic dispersion D and positive chromatic dispersion slope S. The chromatic dispersion D at the wavelength of 1550 nm in the sections A is +29.7 ps/nm/km and the chromatic dispersion slope S at the wavelength of 1550 nm in the sections A is –0.079 ps/nm$^2$/km, while the chromatic dispersion D and the chromatic dispersion slope S at the wavelength of 1550 nm in the section B are respectively –12.4 ps/nm/km and +0.033 ps/nm$^2$/km. Since the locally-zero-dispersion wavelength is present at the long wavelength side of the operating wavelength band of 1510 nm to 1600 nm, the expansion of the operating wavelength band to the short wavelength side becomes possible.

Figure 11:
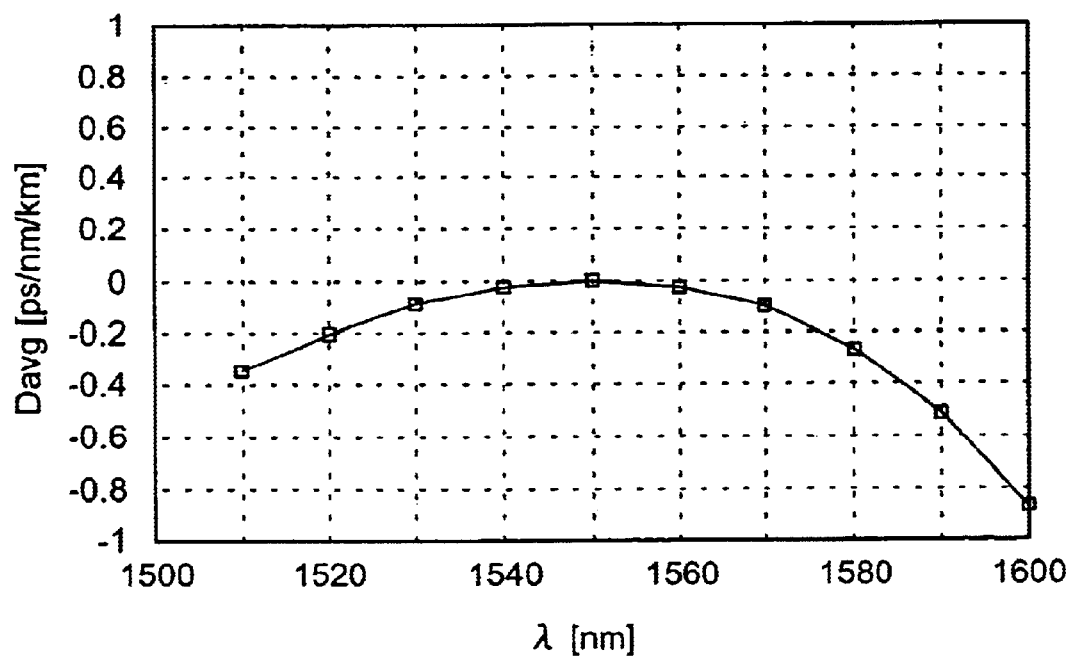

FIG. 11 is a view showing a mean chromatic dispersion D$_{avg}$ of the optical fiber when the sections A having a length of 0.42 is combined to the sections B having a length of 1. The mean chromatic dispersion D$_{avg}$ and the mean chromatic dispersion slope S$_{avg}$ become substantially zero at the wavelength 1550 nm. Accordingly, in the optical fiber transmission path having the sections A and the sections B at the above-mentioned ratio, the absolute value of the mean chromatic dispersion in the wide wavelength band from 1510 nm to 1600 nm is set to not more than 1 ps/nm/km. On the other hand, as shown in FIG. 10, the absolute value of the local chromatic dispersion is 10 ps/nm/km or more and hence is large. Further, although the absolute value of the local chromatic dispersion is small (for example, not more than 1 ps/nm/km) in the partial fiber sections corresponding to the transition sections C, the length of such fiber sections can be made short (for example, not more than 1 m) such that the ratio that such a length occupies to the whole fiber can be made as small as possible to an ignorable level whereby the influence of the nonlinear optical phenomena in the transition sections C is of a level that the influence can be ignored. Accordingly, the expansion of the optical pulses due to the total chromatic dispersion and the deterioration of the transmission quality due to the nonlinear optical phenomena between optical signals having different wavelengths can be suppressed simultaneously.

In this manner, according to the optical fiber 10a of this embodiment, since the refractive index distribution in cross section of the fiber can be largely changed along the fiber axis, the characteristics of chromatic dispersion to wavelength can be largely changed along the fiber axis. Accordingly, the chromatic dispersion characteristics which is difficult or impossible to realize with an optical fiber made of a single of fiber sections can be realized. Particularly, the characteristics that the absolute value of the local chromatic dispersion is large and the absolute value of the total chromatic dispersion is small can be realized.

Further, by properly designing the change of the characteristics of the chromatic dispersion to wavelength along the fiber axis, an optical fiber which has fiber sections A where the chromatic dispersion in a wavelength band of 1510 nm to 1600 nm is larger than 10 ps/nm/km and fiber sections B where the chromatic dispersion in the wavelength band is smaller than –10 ps/nm/km and has absolute value of the mean chromatic dispersion in the wavelength band which is smaller than 1 ps/nm/km can be realized. In the optical fiber 10a of this embodiment, by largely changing the refractive index distribution in the cross section of the fiber along the fiber axis compared with the conventional dispersion managed fiber, the characteristics of the chromatic dispersion to wavelength can be largely changed along the fiber axis and hence, the absolute value of the local chromatic dispersion at each section can be made larger than that of the prior art. As a result, the distortion of the optical pulses due to the total chromatic dispersion can be suppressed and the deterioration of the transmission quality due to the nonlinear optical phenomena among optical signals having different wavelengths can be made smaller compared to the prior art.

Further, in the optical fiber 10a of this embodiment, by largely changing the refractive index distribution in the cross section of the fiber along the fiber axis compared with the conventional dispersion managed fiber, the characteristics of the chromatic dispersion to wavelength can be largely changed along the fiber axis. Accordingly, an optical fiber having a following constitution can be realized. That is, the optical fiber has fiber sections A where the chromatic dispersion in a wavelength band of 1510 nm to 1600 nm is larger than 10 ps/nm/km and fiber sections B where the chromatic dispersion in the wavelength band is smaller than –10 ps/nm/km. An absolute value of the mean chromatic dispersion of the optical fiber in the wavelength band becomes smaller than 1 ps/nm/km. A chromatic dispersion slope in the fiber sections A in the wavelength band is set to negative and a chromatic dispersion slope in the fiber sections B in the wavelength band is set to positive. As a result, compared with the prior art, the wavelength band where the absolute value of the total chromatic dispersion becomes smaller than a given value is broadened and hence, the transmission capacity can be increased.

Further, a plurality of sections B which are made of the main medium and do not include voids are spaced apart along the fiber axis. Accordingly, in the sections B, the optical fiber can be cut and fused and connected with other optical fiber by fusion connection. Here, different from the conventional microstructured optical fiber, problems such as the deformation or dissipation of the sub-medium regions due to fusion and the interruption of the recognition of the core due to the sub-medium regions do not arise and hence, the fusion connection can be performed more easily than the conventional microstructured optical fiber. Further, no voids which open to atmosphere at the end surface exist and hence, no contaminant intrudes into the voids. Accordingly, a mechanical connection of a low loss can be realized using a refractive index matching liquid. Further, even when a side surface is damaged in a partial fiber section A and a contaminant such as water intrudes into the voids, the contaminant is prevented from extending over the whole fiber and hence, the optical fiber can exhibit the higher resistance to damages compared with a conventional microstructured optical fiber.

Further, in the optical fiber of this embodiment, the optical fiber may adopt a constitution where a plurality of unit fiber sections each of which is constituted by the section A, the transition section C, the section B and another transition section C in this order are arranged along the fiber axis. In such a constitution, the refractive index of the voids is constant along the fiber axis and the cross-sectional area thereof is changed periodically along the fiber axis. As a result, an optical fiber whose local chromatic dispersion is changed periodically along the fiber axis can be realized. In such an optical fiber, even when the fiber length is changed with a length several integer times greater than the length of a unit fiber section, the wavelength which makes the total chromatic dispersion zero over the whole fiber is not changed. Accordingly, the change of the chromatic dispersion characteristics of the transmission path corresponding to the change of the transmission path length can be reduced and hence, the transmission path length can be changed easily.

By setting the length of the above-mentioned unit fiber sections to not smaller than 1 m, the excessive transmission loss generated by the coupling of the propagation mode and the radiation mode can be reduced and the number of fiber sections which are included in the optical fiber of a unit length and in which the inter-mode coupling is generated can be reduced and hence, the transmission loss can be reduced.

Further, in the case that the length of the transition sections C is set to not smaller than 0.5 m, the refractive index of the voids is constant along the fiber axis and the cross-sectional area of the voids is continuously changed along the fiber axis. However, this change is sufficiently gentle compared to wavelength of light (usually, 1550 nm) and hence, the loss derived from the mode coupling in the transition sections can be reduced and the transmission loss of the optical fiber can be reduced.

In the optical fiber $10a$ of this embodiment, silica glass is used as the main medium and air is used as the sub medium. Accordingly, the cross-sectional area of the voids can be easily changed along the fiber axis by adjusting the furnace temperature or the pressure in the voids at the time of fiber drawing. Further, since the relative refractive index difference between silica glass and air is approximately 35% and hence is large, the chromatic dispersion characteristics can be largely changed with a small change of the cross-sectional area of the voids. Accordingly, compared with the conventional dispersion managed fiber, the chromatic dispersion characteristics can be largely changed along the fiber axis. Further, since the transparency of the silica glass and air is high, the transmission loss of the optical fiber can be suppressed to a low level.

It may be possible to constitute an optical fiber made of only sections A as a modification of the optical fiber $10a$ of the present invention. This optical fiber can realize an optical fiber which has the positive chromatic dispersion and the negative chromatic dispersion slope in a given wavelength band.

Such an optical fiber is suitable for compensating for the chromatic dispersion and the chromatic dispersion slope of an optical fiber having the negative chromatic dispersion and the positive chromatic dispersion slope in such a given wavelength band. In a prior art which modulates the refractive indices by doping fluorine or the like into the optical fiber, since the change range of the refractive indices is small, it has been difficult to realize the optical fiber of this modification which has the positive chromatic dispersion and the negative chromatic dispersion slope. According to the present invention, with the providing of the sub mediums, the large change of refractive indices can be formed equivalently and hence, such an optical fiber can be easily realized so that an optical transmission pass of a broad band can be realized.

Here, although the case in which the circular annular region including the voids 4 is made of a single layer has been explained, it may be possible to adjust the refractive index distribution in cross section by adopting the multi-layered circular annular region and adjusting the structural density as has been explained with respect to the first embodiment.

Figure 12A:
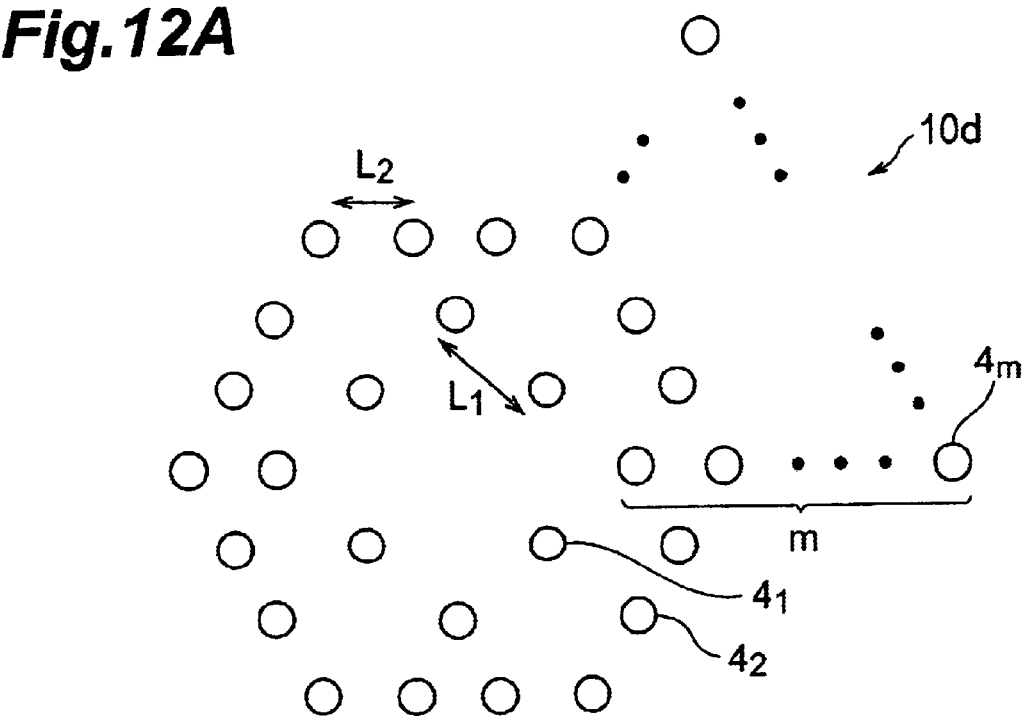
FIG. 12A and FIG. 12B are respectively transverse cross-sectional views of third and fourth embodiments of an optical fiber according to the present invention.

Subsequently, the third and the fourth embodiments of the optical fiber according to the present invention are explained in conjunction with FIG. 12A, FIG. 12B and FIG. 13. FIG. 12 A is a transverse cross-sectional view showing the third embodiment of the optical fiber according to the present invention, FIG. 12B is a transverse cross-sectional view showing the fourth embodiment of the optical fiber according to the present invention, and FIG. 13 is a transverse cross-sectional view showing a conventional microstructured optical fiber.

Figure 13:
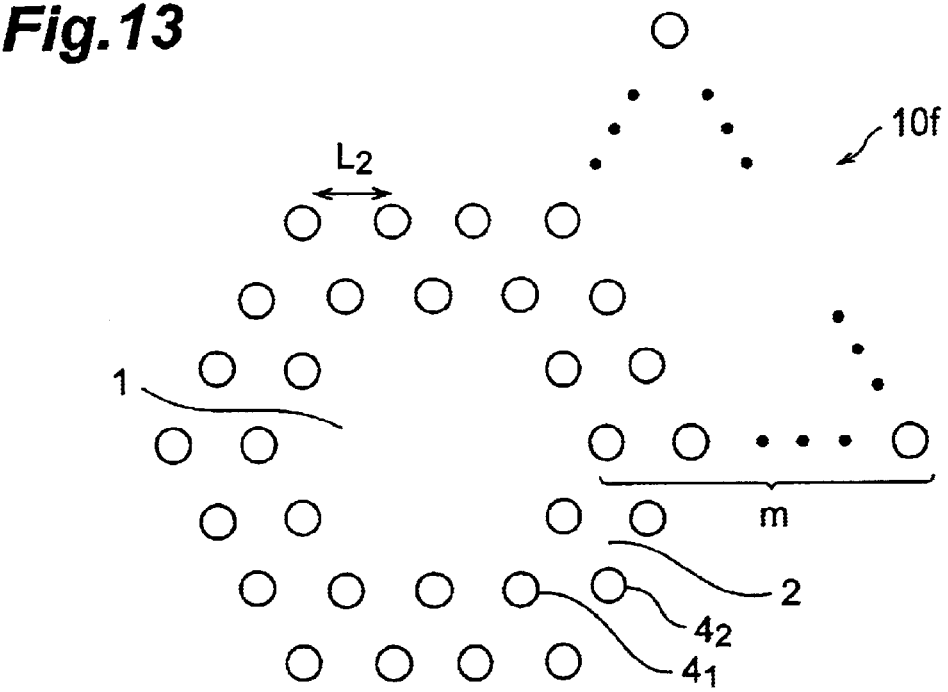
FIGS. 13 to FIG. 15 are cross-sectional views showing a conventional microstructured optical fiber.
Figure 14:
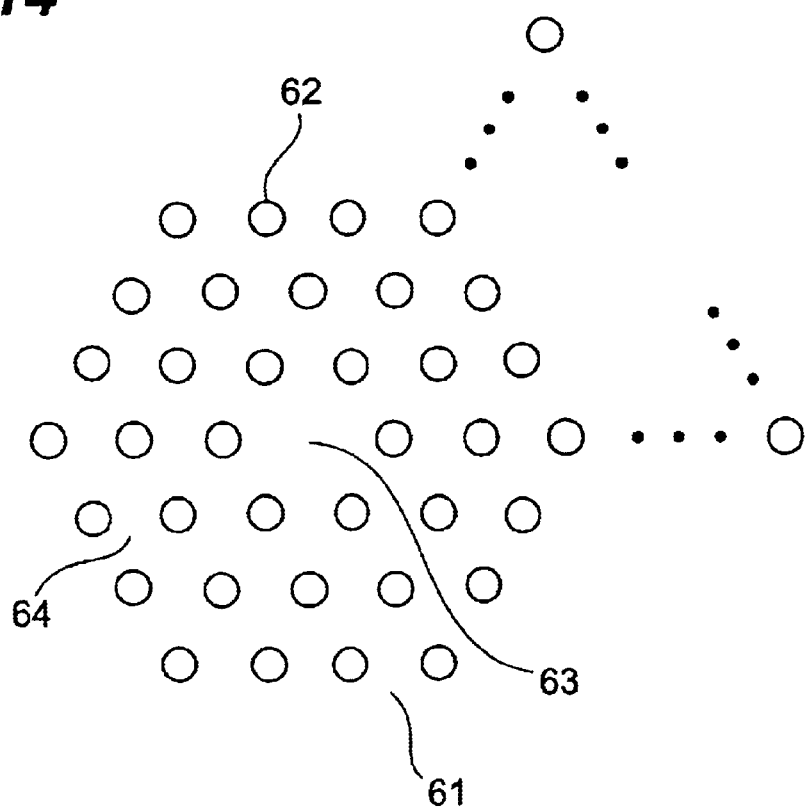
Figure 15:
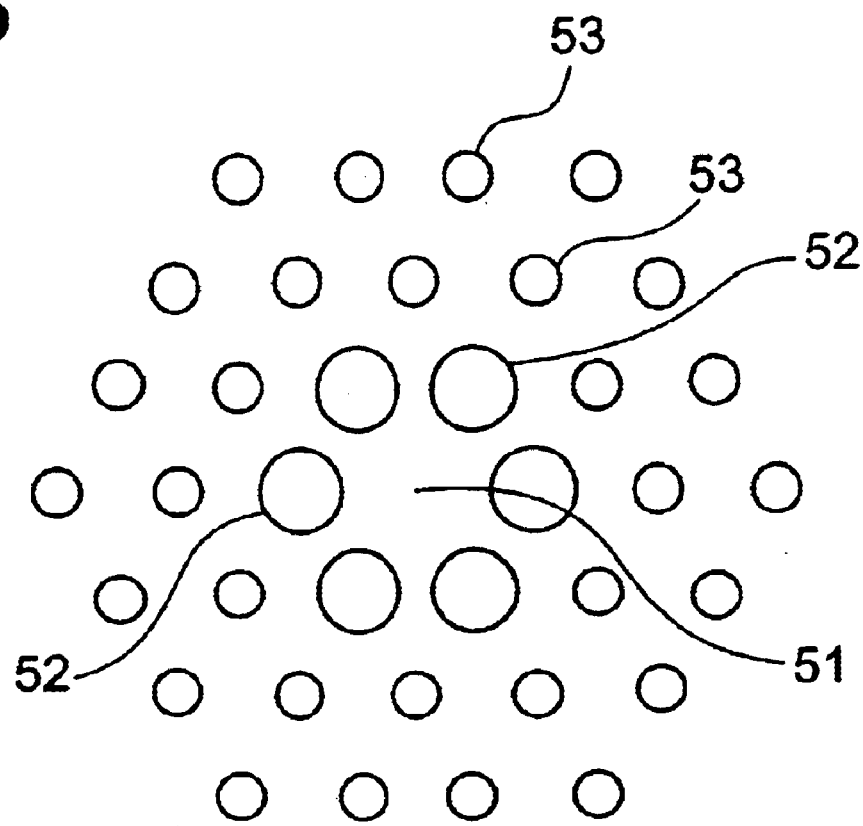

In the conventional microstructured optical fiber $10f$ shown in FIG. 13, a large number of voids 4 are arranged in a hexagonal lattice pattern at a uniform pitch L by m layers in the main medium, wherein the region which constitutes a central portion and is not provided with the voids 4 functions as a core region 1 and the surrounding regions containing the voids 4 function as a cladding region 2. This conventional microstructured optical fiber $10f$ is an optical fiber having a homogeneous cladding structure as in the case of the example 1 of the previously mentioned first embodiment.

To the contrary, the optical fiber $10d$ of the third embodiment shown in FIG. 12A is characterized by designing the arrangement pitch $L_1$ of the voids $4_1$ at the innermost peripheral side longer than the arrangement pitch $L_2$ of the voids $4_2$ to $4_m$ at the outside. By adopting such an arrangement of the voids 4 so as to reduce the structural density of the innermost peripheral cladding region, as in the case of the example 2 of the previously mentioned first embodiment, the mean refractive index of the innermost peripheral cladding region can be increased so as to decrease the sensitivity of the chromatic dispersion to the fluctuation of the structural parameters whereby the large effective core area can be realized and the low bending loss can be realized.

Figure 12B:
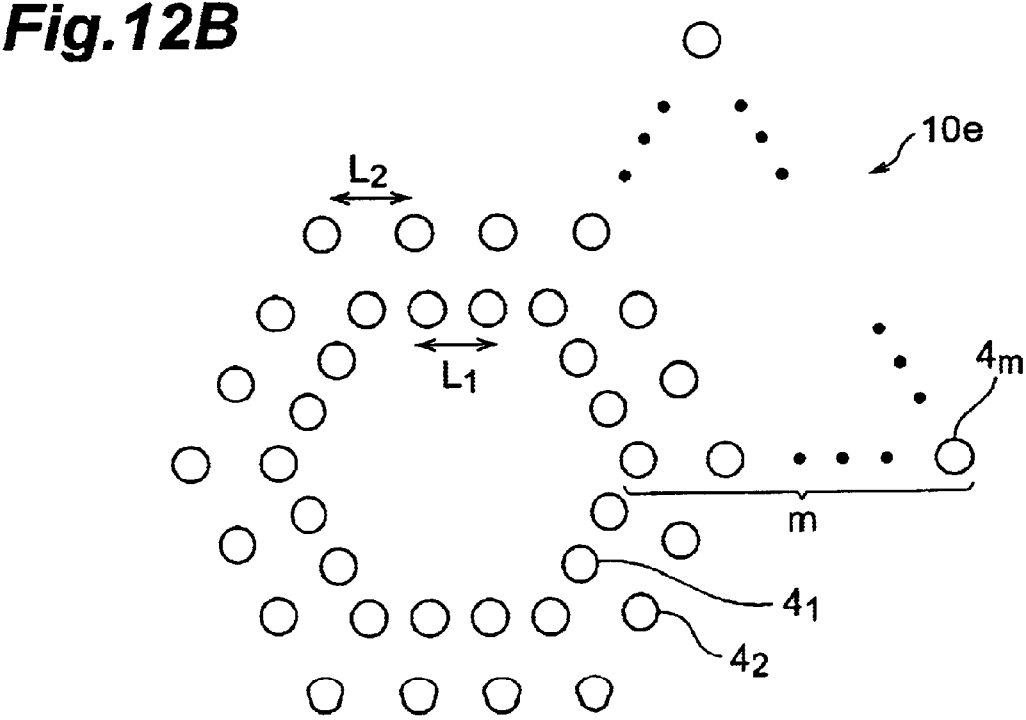

On the other hand, the optical fiber $10e$ of the fourth embodiment shown in FIG. 12B is characterized by designing the arrangement pitch $L_1$ of the voids $4_1$ at the innermost peripheral side shorter than the arrangement pitch $L_2$ of the voids $4_2$ to $4_m$ at the outside. By adopting such an arrangement of the voids 4 so as to increase the structural density of the innermost peripheral cladding region, as in the case of the examples 3 and 4 of the previously mentioned first embodiment, the mean refractive index of the innermost peripheral cladding region can be decreased whereby the large chromatic dispersion to negative and the large chromatic dispersion slope to negative can be realized.

Without arranging the voids in a concentric pattern as shown in the first embodiment, even when the voids are arranged in a hexagonal lattice pattern or other arrangement mode is adopted as described above, the desired mean refractive index distribution can be obtained by changing the structural density in accordance with regions and an optical fiber having desired optical characteristics can be realized accordingly. It may be possible to change the arrangement method corresponding to the regions to obtain the desired structural density (See FIG. 12A).

Although the example in which the silica glass is used as the main medium and air is used as the sub mediums has been explained in the above mentioned respective embodiments, the main medium and the sub mediums are not limited to these materials. Plastics or the like can be also used as the main medium besides the glass while various of gasses, liquids or solids having optical characteristics different from the main medium can be used as the sub mediums. Further, the inside of the voids may be evacuated. It may be also possible to form the sub medium regions by a plurality of mediums. In this case, it may be possible to adjust the refractive indices of sub medium regions along its axis, for example, by adjusting the ratio of respective mediums in the sub medium regions.

Further, it may be possible to make the cross-sectional areas of sub medium regions different from each other in respective regions or in the inside of the regions. However, an advantageous effect that the designing and the fabrication of the optical fiber become easy can be obtained when the shape and the dimension of the sub medium regions are similar at least among the sub medium regions which have the equal structural density. It is more desirable to unify the shape and the dimension of all sub medium regions in the same transverse cross section. Even in the case that the cross-sectional areas of the sub medium regions are made different by making the dimensions and the shapes of the sub medium regions different, when the ratio between the maximum area and the minimum area exceeds 10, the magnitude of the change in the area fraction of the sub medium at the time of fiber drawing becomes largely different among the sub medium regions and the sub medium region which takes the minimum value becomes excessively small so that it gives rise to a problem that the stable fabrication of the optical fiber becomes difficult and hence is not preferable. Accordingly, even in the case that the cross-sectional areas are made different, it is preferable to set the ratio between the maximum area and the minimum area within 10.

What is claimed is:

1. An optical fiber composed of a core and a cladding surrounding the core, where a given cross section of said cladding includes a plurality of regions made of sub mediums having refractive indices different from the refractive index of the main medium constituting said cladding, wherein said regions made of said sub mediums are arranged in one given or a plurality of given circular annular regions and the centers of said regions made of said sub mediums in each of said circular annular regions are arranged on the same circumference centered at the center of said core and having a diameter predetermined for each of said circular annular regions.

2. An optical fiber according to claim 1, wherein at least one of cross-sectional areas and refractive indices of said regions made of said sub mediums changes along the fiber axis.

3. An optical fiber according to claim 2, wherein sections where said cladding does not contain said sub mediums are spaced along the fiber axis.

4. An optical fiber according to claim 2, wherein the chromatic dispersion at a given wavelength is changed along the fiber axis.

5. An optical fiber according to claim 4, wherein said optical fiber includes at least a section of the first kind where said chromatic dispersion at said wavelength is positive and at least a section of the second kind where said chromatic dispersion at the same wavelength is negative.

6. An optical fiber according to claim 5, wherein said chromatic dispersion at said given wavelength is larger than 1 ps/nm/km in said section of the first kind, said chromatic dispersion at said wavelength is smaller than −1 ps/nm/km in said section of the second kind, and the total length of fiber sections whose absolute value of chromatic dispersion becomes below 1 ps/nm/km at said wavelength is below 1/10 of the full length of said optical fiber.

7. An optical fiber according to claim 5, wherein the sign of the dispersion slope at said given wavelength is different between the said section of the first kind and said section of the second kind.

8. An optical fiber according to claim 7, wherein said chromatic dispersion slope at said given wavelength is negative in said section of the first kind and is positive in said section of the second kind.

9. An optical fiber according to claim 2, wherein the structural density of said sub-medium regions is different between at least said two circular annular regions.

10. An optical fiber according to claim 9, wherein the cross-sectional areas of said respective regions made of said sub mediums are substantially uniform in the transverse cross section of each of said circular annular regions.

11. An optical fiber according to claim 10, wherein the cross-sectional areas of said region made of said sub mediums are all substantially uniform in the transverse cross section of the fiber.

12. An optical fiber composed of a core and a cladding surrounding said core, where a given cross-section of said cladding includes a plurality of regions made of sub mediums having refractive indices different from the refractive index of the main medium constituting said cladding, wherein said optical fiber has at least two cladding regions, and structural densities of the region made of said sub mediums are different between said two cladding regions.

13. An optical fiber according to claim 12, wherein the maximum value of the cross-sectional areas of said regions made of said sub mediums in the cross section of the fiber is smaller than 10 times of the minimum value of them.

14. An optical fiber according to claim 13, wherein the cross-sectional areas of said regions made of said sub mediums are all substantially uniform in the cross section of the fiber.

* * * * *